United States Patent [19]
Blecker et al.

[11] Patent Number: 5,088,899
[45] Date of Patent: Feb. 18, 1992

[54] PUMP WITH DRIVE MOTOR

[75] Inventors: Armin Blecker, Asslar-Werdorf; Heinrich Lotz, Wetzlar; Helmut Ochs, Löhnberg; Horst Reuschling, Giessen-Kl.Li, all of Fed. Rep. of Germany

[73] Assignee: Arthur Pfeiffer Vakuumtechnik Wetzlar GmbH, Fed. Rep. of Germany

[21] Appl. No.: 611,915

[22] Filed: Nov. 9, 1990

[30] Foreign Application Priority Data

Nov. 9, 1989 [DE] Fed. Rep. of Germany ....... 3937345

[51] Int. Cl.⁵ ............................................. F04B 35/04
[52] U.S. Cl. ................................................... 417/356
[58] Field of Search .......................................... 417/356

[56] References Cited

U.S. PATENT DOCUMENTS 2,592,612  4/1952  Smith, Jr. .......................... 415/356

Primary Examiner—Richard A. Bertsch
Assistant Examiner—Charles G. Freay
Attorney, Agent, or Firm—Toren, McGeady & Associates

[57] ABSTRACT

A pump for conveying liquids and gases is formed by a drive motor having a stator (1) and a rotor (2). Helically shaped conveying grooves (3) are formed in the rotor (2) so that the rotor also serves as the shaft for the pump.

4 Claims, 1 Drawing Sheet

U.S. Patent        Feb. 18, 1992        5,088,899
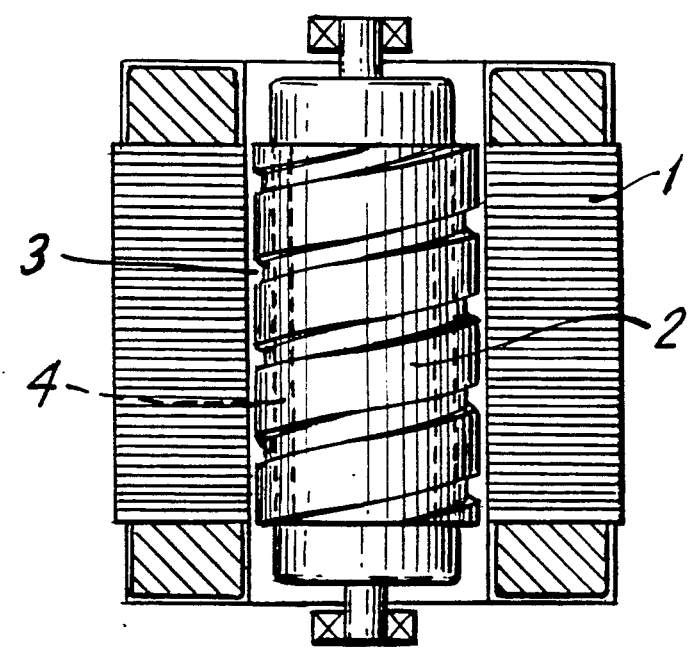

PUMP WITH DRIVE MOTOR

BACKGROUND OF THE INVENTION

The present invention is directed to a pump for conveying liquids and gases with the pump including a drive motor. The pump is incorporated in the shaft of the drive motor in the form of helically shaped grooves. A principal use of such a pump is to supply ball bearings with oil.

Known pumps for conveying oil are constructed so that the helically shaped grooves are arranged on an extended shaft of the drive motor.

Since such oil pumps are frequently used as auxiliary apparatus in complicated systems, such as in a vacuum pump, the space requirement and arrangement of the pump is often considered as being excessive.

SUMMARY OF THE INVENTION

Therefore, the primary object of the present invention is to provide a lubricating or oil pump having a compact structure whereby it requires only a minimum space. The cost for the construction and assembly of the pump is kept within limits and a high efficiency is assured.

In accordance with the present invention, the drive motor for the pump is formed of a stator and a rotor. Helically shaped conveying grooves are formed in the rotor extending for the axial extent of the stator so that the rotor simultaneously serves as the pump and part of the drive motor. The width or axial extent of the grooves as compared to the axial length of the motor or rotor is particularly significant in establishing the saturated magnetic field of the motor. In addition, where current-carrying conductors extend axially through the rotor, they are located radially inwardly of the helically shaped grooves.

The helically shaped conveying grooves are formed within the motor in the outer surface of the rotor, and they must not be allowed to significantly impair the operation of the motor. Initially, the sum of the groove widths in the axial direction as compared to the overall axial length of the motor must be kept within limits, so that the magnetic flux between the motor stator and rotor is not reduced by too high a magnetic resistance. Moreover, it must be taken into consideration that a bundling of the lines of the magnetic field exists between the grooves of the rotor, whereby the magnetic field strength is increased in these regions. If the magnetic field strength in such regions exceeds the saturation in the rotor, then the increase exists without having any effect. For optimum efficiency, the magnetic field should be maintained, to the extent possible, below saturation, so that the partial magnetic field strength increase generated between the grooves by the bundling of the lines of the magnetic field does not exceed saturation. The following dimensional characteristics form criteria for the optimum dimensioning of the magnetic field generated by the stator.

The magnetic field $H_{St}$ generated by the stator is to be weaker by that share of the saturated magnetic field as corresponding to the ratio of the sum A of the groove widths to the overall axial length L of the rotor. This is expressed as follows:

$$H_{St} \leq H_{Sat}(L-A/L)$$

If an asynchronous motor is used, care must be taken that the helically shaped conveying grooves do not interrupt the current-carrying conductor in the outer region of the rotor. To satisfy this requirement, the slots for the current-carrying conductors are located radially inwardly of the bases of the helically-shaped grooves.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The drawing is an axially extending cross sectional view of the pump and drive motor embodying the present invention.

DETAILED DESCRIPTION OF THE INVENTION

As shown in the drawing, the drive motor is formed by an axially extending stator 1 with an axially extending rotor 2 positioned within the stator. Helically shaped grooves 3 are formed in the outer surface of the rotor, whereby the rotor also operates as a pump. Current-carrying conductors, such as used in an asynchronous motor, are located in axially extending slots located in the outer region of the rotor but radially inwardly of the bases of the helically shaped conveying grooves 3.

While specific embodiments of the invention have been shown and described in detail to illustrate the application of the inventive principles, it will be understood that the invention may be embodied otherwise without departing from such principles.

We claim:

1. A pump with a drive motor for conveying liquids and gases, said pump comprising an axially extending shaft (2) having an outer surface, at least one helically extending groove (3) for conveying liquid and gas formed in the outer surface of said shaft (2), said drive motor comprising an axially extending stator (1) and an axially extending rotor (2) located within said stator, and said shaft (2) forms said rotor with said groove (3) extending around the outer surface of said rotor (2) for the axial extent thereof.

2. A pump, as set forth in claim 1, wherein said stator (1) has a magnetic field $H_{St}$ with a lesser strength than a share of a saturated magnetic field $H_{Sat}$ expressed as follows:

$$H_{St} \leq H_{Sat}(L-A/L)$$

wherein A is the sum of the groove widths and L is the axial length of the rotor.

3. A pump, as set forth in claim 1, wherein said rotor has axially extending slots (4) therein for current-carrying conductors of said rotor (2) with said slots located radially inwardly of said helically shaped grooves (3).

4. A pump, as set forth in claim 2, wherein said rotor has axially extending slots (4) therein for current-carrying conductors of said rotor (2) with said slots located radially inwardly of said helically shaped grooves (3).

* * * * *